United States Patent
Boontor

(10) Patent No.: US 7,706,414 B2
(45) Date of Patent: Apr. 27, 2010

(54) METHOD AND APPARATUS FOR FACILITATING DOWNSTREAM FREQUENCY OVERRIDE IN A DATA-OVER-CABLE SYSTEM

(75) Inventor: Polh Boontor, Somerville, MA (US)

(73) Assignee: General Instrument Corporation, Horsham, PA (US)

( * ) Notice: Subject to any disclaimer, the term of this patent is extended or adjusted under 35 U.S.C. 154(b) by 507 days.

(21) Appl. No.: 11/468,132

(22) Filed: Aug. 29, 2006

(65) Prior Publication Data

US 2008/0056306 A1 Mar. 6, 2008

(51) Int. Cl.
*H04J 3/06* (2006.01)

(52) U.S. Cl. .................. 370/513; 370/514; 375/222; 725/111

(58) Field of Classification Search .......... None
See application file for complete search history.

(56) References Cited

U.S. PATENT DOCUMENTS

| | | | |
|---|---|---|---|
| 7,089,580 B1 * | 8/2006 | Vogel et al. ............. 725/111 |
| 7,120,123 B1 * | 10/2006 | Quigley et al. .......... 370/252 |
| 7,215,727 B2 * | 5/2007 | Yousef et al. ............ 375/376 |
| 2003/0177502 A1 * | 9/2003 | Kolze et al. ............. 725/111 |
| 2003/0185180 A1 * | 10/2003 | Min et al. ................ 370/336 |
| 2004/0170157 A1 * | 9/2004 | Kim et al. ............... 370/349 |
| 2005/0097617 A1 * | 5/2005 | Currivan et al. ........ 725/111 |
| 2005/0122996 A1 * | 6/2005 | Azenkot et al. ......... 370/477 |
| 2007/0211618 A1 * | 9/2007 | Cooper et al. ........... 370/208 |

* cited by examiner

Primary Examiner—Gregory B Sefcheck
Assistant Examiner—Suk Jin Kang
(74) Attorney, Agent, or Firm—Larry T. Cullen

(57) ABSTRACT

A method and apparatus for facilitating downstream frequency override in a data-over-cable system is described. In one example, a data-over-cable system having a plurality of cable modem termination system (CMTS) elements is described. Each of the CMTS elements includes demodulation logic configured to detect one of a plurality of native preambles in upstream transmissions. Each of the native preambles may include a first section having a unique pattern and a second section having an equalizer training sequence. A concatenated preamble is formed from each of the native preambles. The concatenated preamble may include a first section having the unique pattern of each of the native preambles in a sequence and a second section having an equalizer training sequence. A burst profile is formed having the concatenated preamble for each of the CMTS elements. The burst profile is transmitted from each of the CMTS elements to a plurality of cable modems.

16 Claims, 4 Drawing Sheets

METHOD AND APPARATUS FOR FACILITATING DOWNSTREAM FREQUENCY OVERRIDE IN A DATA-OVER-CABLE SYSTEM

BACKGROUND OF THE INVENTION

1. Field of the Invention

The present invention relates to data-over-cable systems and, more particularly, to a method and apparatus for facilitating downstream frequency override in data-over-cable system.

2. Description of the Background Art

With the explosive growth of the Internet, many customers have desired to use the larger bandwidth of a cable television network to connect to the Internet and other computer networks. Cable modems offer customers higher-speed connectivity to the Internet, an intranet, local area networks ("LANs"), and other computer networks via cable television networks.

The physical plant of the data-over-cable system may be divided into physically isolated branches that distribute digital signals from multiple cable modem termination system ("CMTS") elements to geographically distinct groups of cable modems. Typically, a cable modem has access to downstream frequencies from more than one of the CMTS elements. By contrast, in the reverse or upstream direction, the cable modem has access to only one of the CMTS elements. Cable modems transmit to CMTS elements using a set of upstream transmission parameters that may differ from one CMTS element to another. A CMTS instructs cable modems to use particular upstream transmission parameters using messages carried in downstream transmissions.

When a cable modem is connected to a data-over-cable system, it must first gain access to the system by undergoing an initialization procedure before it is permitted to transmit data. A part of the initialization procedure includes a ranging process for adjusting the timing of the cable modem transmissions to its associated CMTS. This process involves sending a ranging message at an appropriate time interval, referred to as the Initial Maintenance interval. In some cases, a cable modem will synchronize to a downstream frequency provided by a CMTS other than the CMTS receiving the cable modem's upstream transmissions. When the cable modem sends a ranging message, the CMTS receiving the message re-directs the cable modem to use one of its downstream frequencies. This process is referred to as Modem Downstream Frequency Override (MDFO) or simply "frequency override."

A cable modem sends the ranging message in accordance with upstream transmission parameters obtained from downstream transmissions of the CMTS with which it is synchronized. If the cable modem synchronizes to the wrong downstream frequency, however, these upstream transmission parameters may be different than those expected by the CMTS to which the cable modem sends upstream transmissions. As a result, the CMTS cannot process the ranging message and thus cannot perform the frequency override procedure. The CMTS will not be able to process any message from the cable modem, effectively preventing upstream transmission by the cable modem Accordingly, there exists a need in the art for facilitating downstream frequency override in a data-over-cable system.

SUMMARY OF THE INVENTION

One aspect of the invention relates to a method for communicating in a data-over-cable system having a plurality of cable modem termination system elements each having demodulation logic configured to detect one of a plurality of native preambles in upstream transmissions. A concatenated preamble is formed from each of the plurality of native preambles. A burst profile having the concatenated preamble for each of the cable modem termination system elements is formed. The burst profile is transmitted from each of the cable modem termination system elements to a plurality of cable modems.

Another aspect of the invention relates to a cable modem termination system apparatus. Modulation logic is configured to provide downstream transmissions via at least one downstream frequency. Demodulation logic is configured to detect a native preamble in upstream transmissions from at least a portion of a plurality of cable modems. Control logic is configured to form a concatenated preamble from a plurality of native preambles, form a burst profile having the concatenated preamble, and transmit the burst profile towards the plurality of cable modems as part of the downstream transmissions. The plurality of native preambles including the native preamble and at least one other native preamble for demodulation logic of a respective at least one other cable modem termination system.

Another aspect of the invention relates to a data-over-cable apparatus including a plurality of cable modems, a transport network, and a plurality of cable modem termination system elements. The cable modem termination system elements are in communication with the plurality of cable modems through the transport network. Each of the plurality of cable modem termination system elements includes: demodulation logic, modulation logic, and control logic. The demodulation logic is configured to detect one of a plurality of native preambles in upstream transmissions. The modulation logic is configured to provide downstream transmissions via at least one downstream frequency. The control logic is coupled to the demodulation logic and the modulation logic. The control logic in each of the plurality of cable modem termination system elements is configured to form a concatenated preamble from each of the plurality of native preambles, form a burst profile having the concatenated preamble, and transmit the burst profile towards the plurality of cable modems as part of the downstream transmissions thereof.

Another aspect of the invention relates to computer readable medium having stored thereon instructions that when executed by a processor cause the processor to perform a method for communicating in a data-over-cable system having a plurality of cable modem termination system elements each having demodulation logic configured to detect one of a plurality of native preambles in upstream transmissions. A concatenated preamble is formed from each of the plurality of native preambles. A burst profile having the concatenated preamble for each of the cable modem termination system elements is formed. The burst profile is transmitted from each of the cable modem termination system elements to a plurality of cable modems.

Those skilled in the art will appreciate that the preamble concatenation technique of the invention allows a multiple downstream frequency override feature to operate seamlessly across cable modem termination system (CMTS) platforms.

The technique compensates for the fact that the demodulation logic of two or more CMTS platforms may use different preamble patterns to detect an upstream burst from cable modems. By concatenating both preamble patterns together, the demodulation logic of each CMTS is able to share the same preamble pattern. The invention allows multiple CMTS platforms to detect IM bursts regardless of which downstream frequency a cable modem is using. As a result, each CMTS is able to successfully employ multiple downstream frequency override operations.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
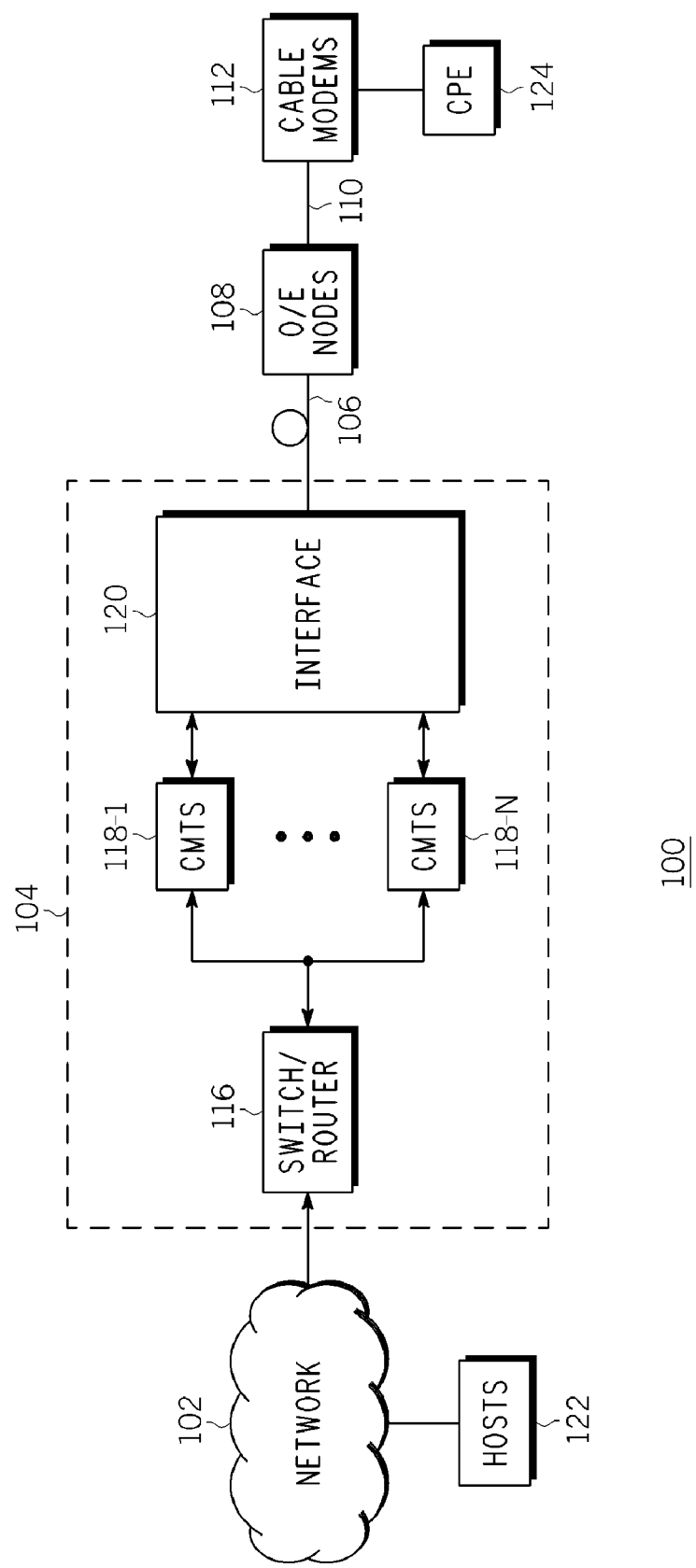
FIG. 1 is a block diagram depicting an exemplary embodiment of a data-over-cable system in accordance with one or more aspects of the invention.

FIG. 1 is a block diagram depicting an exemplary embodiment of a data-over-cable system 100 in accordance with one or more aspects of the invention. The system 100 includes a distribution facility 104 in communication with a plurality of cable modems 112. The distribution facility 104 includes a network interface in communication with a packet network 102 (e.g., the Internet or a network coupled to the Internet), and an interface in communication with an optical fiber network 106, which may be optical, radio frequency (RF), or a combination of optical and RF. The optical fiber network 106 is coupled to optical/electrical (O/E) nodes 108. The O/E nodes 108 convert optical signals in the fiber network 106 to electrical signals for transmission over a coaxial cable network 110 to the cable models 112. Together, the optical fiber network 106, the O/E nodes 108, and the coaxial cable network 110 are often referred to in the art as a Hybrid Fiber Cable (HFC) network. The cable modems 112 demodulate the electrical signals, extract digital data, and supply the digital data to various customer premise equipment (CPE) 124, such as personal computers, multimedia displays, or the like.

The system 100 provides a mechanism by which hosts 122 coupled to the packet network 102 may communicate with the CPE 124 coupled to the cable modems 112 via a data-over-cable infrastructure. The distribution facility 104 is typically a central location in a cable television network that is responsible for sending cable signals in the downstream direction as defined below. For example, the distribution facility 104 may comprise a headend or a distribution hub.

The distribution facility 104 illustratively includes a switch or router ("switch/router 116"), cable modem termination systems (CMTSs) 118-1 through 118-N (collectively referred to as CMTSs 118), and an interface 120, where N is an integer greater than zero. Portions of the distribution facility 104 specifically related to distribution of cable television signals are omitted for clarity. The distribution facility 104 is coupled to the packet network 102 via the switch/router 116. The switch/router 116 is further coupled to network interfaces of the CMTSs 118. RF and/or optical interfaces of the CMTSs 118 are coupled to the interface 120. Each of the CMTSs 118 provides a network-side interface to the network 102 and an RF- and/or optical-side interface to the HFC in both the downstream and upstream directions. As used herein, the term "downstream" refers to transmission in the direction from the distribution facility 104 to the cable modems 112. The term "upstream" refers to transmission in the direction from the cable modems 112 to the distribution facility 104. The data-over-cable system 100 may comport with the Data-Over-Cable Service Interface Specifications (DOCSIS) issued by Cable Television Laboratories, Inc, such specifications being known to persons working in the art.

Figure 2:
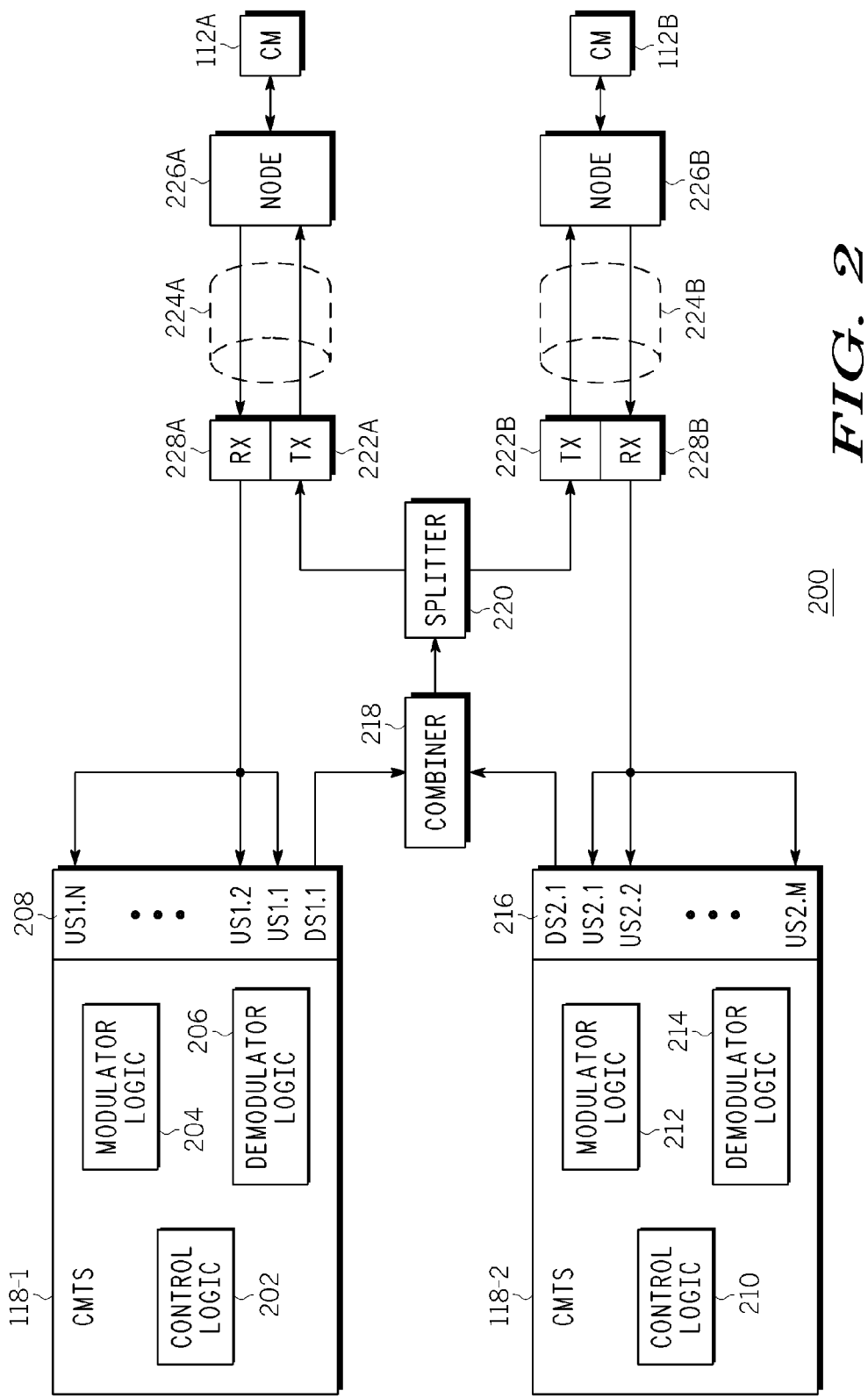
FIG. 2 is a block diagram of a portion of the data-over-cable system of FIG. 1 in accordance with one or more aspects of the invention.

FIG. 2 is a block diagram of a portion 200 of the data-over-cable system 100 in accordance with one or more aspects of the invention. The portion 200 includes a CMTS 118-1, a CMTS 118-2, a cable modem (CM) 112A, and a CM 112B. The CMTS 118-1 includes control logic 202, modulator logic 204, demodulator logic 206, and an RF interface 208. The RF interface 208 includes one downstream port (DS 1.1) and N upstream ports (US 1.1 through US 1.N), where N is an integer greater than zero. The CMTS 118-2 includes control logic 210, modulator logic 212, demodulator logic 214, and an RF interface 216. The RF interface 216 includes one downstream port (DS 2.1) and M upstream ports (US 2.1 through US 2.M), where M is an integer greater than zero. Although only a single downstream port is shown for each of the CMTS 118-1 and the CMTS 118-2, it is to be understood that the CMTS 118-1 and/or the CMTS 118-2 may have more than one downstream port, depending on implementation. In general, a J:K CMTS includes J downstream ports and K upstream ports. Typical CMTS platforms include 1:4, 1:8, and 2:8 platforms, although the invention is not limited to such.

The downstream ports DS 1.1 and DS 2.1 are coupled to inputs of a combiner 218. An output of the combiner 218 is coupled to an input of a splitter 220. Outputs of the splitter 220 are coupled to transmit (TX) modules 222A and 222B, respectively. Each of the downstream ports DS 1.1 and DS 2.1 provide downstream signals of different frequencies. The two downstream frequencies are combined by the combiner 218. The combined signal having the two frequencies is split by the splitter 220 to provide two combined signals having the two downstream frequencies. The TX modules 222A and 222B convert the downstream signals to optical signals, which are coupled to optical fiber bundles 224A and 224B, respectively. The optical fiber bundles 224A and 224B are coupled to the O/E nodes 226A and 226B, respectively. The O/E nodes 226A and 226B convert optical signals to electrical signals and distribute the electrical signals to the CMs 112A and 112B.

In the upstream direction, the CMs 112A and 112B transmit electrical signals upstream to the O/E nodes 226A and 226B, respectively. The O/E nodes 226A and 226B separate the upstream signals from the downstream signals and convert the upstream electrical signals to optical signals. The O/E nodes 226A and 226B transmit the optical signals through the optical fiber bundles 224A and 224B to receive (RX) modules 228A and 228B, respectively. In the portion 200, two branches of the HFC are shown, namely, the "A" branch and the "B" branch. The "A" branch comprises the TX module 222A, the RX module 228A, optical fiber bundle 224A, and O/E node 226A. The "B" branch comprises the TX module 222B, the RX module 228B, the optical bundle 224B, and the O/E node 226B. The HFC network maintains the physical separation of the upstream signals from the CMs 112A and 112B on each branch. The CMTS 118-1 receives upstream signals from the RX module 228A via the upstream ports US 1.1 through US 1.N. The CMTS 118-2 receives upstream signals from the RX module 228B via the upstream ports US 2.1 through US 2.M.

The modulator logic 204 modulates data for downstream transmission via the DS 1.1 downstream port. The modulator logic 204 typically employs a quadrature amplitude modulation (QAM) signal modulation method, although other methods may be employed. QAM can have any number of discrete digital levels typically including 4, 16, 64, or 256 levels. The demodulator logic 206 demodulates upstream transmission received via the US 1.1 through US 1.N ports. The demodulator logic 206 may include separate demodulator circuits for each of the upstream ports. The upstream transmissions are typically modulated using 16-QAM or quadrature phase shift keying (QPSK) modulation techniques.

The control logic 202 is configured to control operation of the CMTS 118-1, including operation of the modulator logic 204 and the demodulator logic 206. The control logic 202 implements a Medium Access Control (MAC) data-link layer ("MAC layer"). As is known in the art, the MAC layer controls access to a transmission medium via the physical layer. The control logic 202 implements a MAC domain for each downstream frequency. The MAC domain supports a given number of cable modems (e.g., a maximum of 2048 cable modems per DOCSIS MAC domain). Information on an exemplary MAC layer protocol may be found in DOCSIS. With one notable exception, the control logic 210, modulator logic 212, and demodulator logic 214 of the CMTS 118-2 operates in a similar manner to the control logic 202, the modulator logic 204, and the demodulator logic 206 of the CMTS 118-1. As described below, the demodulator logic 206 and the demodulator logic 214 require different upstream data transmission parameters, namely, different preambles.

To further understand the invention, a brief description of upstream data transmission between cable modems and a CMTS is recited below. A cable modem typically transmits on an upstream channel during a transmission mini-slot allocated by the CMTS. The upstream channel may be viewed as time-divided into a stream of mini-slots, each of which is a unit of granularity for upstream transmission opportunities. Before transmitting data, a cable modem must request permission to transmit from the CMTS. The CMTS receives transmission requests from several cable modems. In response, the CMTS builds an Upstream Bandwidth Allocation Map message (MAP) and transmits it via the downstream channel to all cable modems. Typically, the CMTS receives requests from a number of cable modems that wish to transmit and may allocate one or more transmission mini-slots to each of the cable modems. The MAP message informs each cable modem of its permitted mini-slot(s) for transmission. In particular, the MAP message informs the cable modems of the allocation of mini-slots for scheduled upstream usage intervals and when to begin such intervals. As is known in the art, each upstream usage interval is composed of transmission intervals, also referred to as "bursts," which comprise at least one mini-slot.

The cable modem may transmit data in packets in adjacent mini-slots according to different transmission formats. The parameters for upstream transmission may include symbol rate, upstream channel frequency, modulation type, the preamble, and forward error correction (FEC) parameters. Since each upstream channel may transmit according to a different transmission format, the cable modems may undergo configuration so that their future transmissions occur according to a particular upstream format. The CMTS may configure the cable modems by issuing an Upstream Channel Descriptor (UCD) message. The UCD includes, among other data, type-length-value (TLV) descriptor data indicative of the upstream data transmission parameters (also referred to as the "burst profile").

Before operation, a cable modem must initialize and register with a CMTS. As part of the initialization procedure, a cable modem searches for a downstream channel. Once it synchronizes with a downstream channel, the cable modem monitors the channel and searches for UCD messages. The cable modem configures itself to transmit according to the burst profile in the UCD messages and then enters a ranging phase. The ranging phase discerns a timing offset such that the cable modem's transmissions are aligned to the appropriate mini-slot boundary. First, the cable modem monitors MAP messages to identify the upstream usage interval reserved by the CMTS for ranging, referred to the Initial Maintenance (IM) interval. When the IM interval occurs for the upstream channel identified in the MAP and UCD messages, the cable modem sends a ranging request (RNG-REQ) message upstream to the CMTS. In response to the RNG-REQ message, the CMTS transmits a ranging response (RNG-RSP) message to the cable modem. In response, the cable modem again monitors the downstream channel for MAP messages to identify another upstream usage interval reserved for ranging, referred to as the Station Maintenance (SM) interval. When the appropriate SM interval occurs, the cable modem sends a RNG-REQ message with appropriate corrections to the transmission parameters as indicated by the RNG-RSP message. The sequence of RNG-REQ and RNG-RSP messages is repeated until the CMTS sends a RNG-RSP message notifying the cable modem that the ranging is successful.

Returning to FIG. 2, each of the CMs 112A and 112B have access to downstream frequencies from different MAC domains, i.e., downstream frequencies from the CMTS 118-1 and the CMTS 118-2. Since the CM 112A transmits upstream through the "A" branch to the CMTS 118-1, the CM 112A should use the downstream frequency of the CMTS 118-1 (i.e., the DS 1.1 downstream frequency). Since the CM 112B transmits upstream through the "B" branch to the CMTS 118-2, the CM 112B should use the downstream frequency of the CMTS 118-2 (i.e., the DS 2.1 downstream frequency). Each of the CMTS 118-1 and the CMTS 118-2 is configured to determine whether a CM is using an improper downstream frequency and re-direct the CM to use the proper downstream frequency. This process is referred to as Modem Downstream Frequency Override (MDFO).

Consider the example where the CM 112A synchronizes to the downstream frequency provided by the CMTS 118-2 (i.e., DS 2.1). Note that the present example is equally applicable to the case where the CM 112B synchronized to the downstream frequency provided by the CMTS 118-1 (i.e., DS 1.1). The CM 112A then receives UCD messages from the CMTS 118-2 and configures itself to transmit according to the burst profile in the UCD messages. The burst profile is dictated by the requirements of the demodulation logic 214. The CM 112A then receives MAP messages from the CMTS 118-2 to identify the IM interval. When the IM interval for the CMTS 118-2 occurs, the CM 112A transmits a RNG-RLQ message. Since the CM 112A is coupled to the "A" branch, the RNG-REQ message is received by the CMTS 118-1, rather than the CMTS 118-2. Assuming the IM intervals of the CMTS 118-1 and the CMTS 118-2 are aligned, the CMTS 118-1 identifies that the CM 112A is using the downstream frequency DS 2.1. The CMTS 118-1 initiates an override the CM's choice of the DS 2.1 downstream frequency and re-directs the CM 112A to use the proper downstream frequency, which is DS 1.1.

To accomplish the MDFO operation, the CMTS 118-1 must be able to demodulate the RNG-REQ message that was modulated in accordance with the burst profile of the CMTS 118-2. Likewise, the CMTS 118-2 must be able to demodulate the RNG-REQ message that was modulated in accordance with the burst profile of the CMTS 118-1. As described above, in the present embodiment, the demodulation logic 206 employs a different burst profile than the demodulation logic 214. Notably, the demodulation logic 206 employs a different preamble pattern than the demodulation logic 214.

Figure 3:
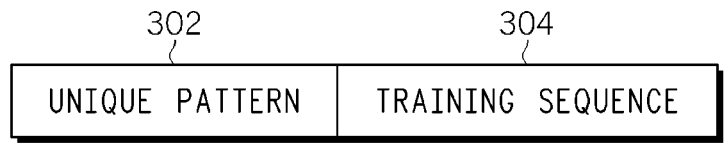
FIG. 3 is a block diagram depicting an exemplary embodiment of the structure of a preamble utilized by demodulation logic of one cable modem termination system (CMTS)

FIG. 3 is a block diagram depicting an exemplary embodiment of the structure of a preamble 300 utilized by the demodulation logic 206 of the CMTS 118-1. The preamble 300 illustratively includes a first section 302 and a second section 304. The first section 302 includes data bits indicative of a pre-defined, unique pattern expected by the demodulation logic 206. For example, the first section 302 may include one or more unique data words or a pre-defined pilot sequence. The second section 304 includes a sequence of data bits that may be utilized by the demodulation logic 206 for equalizer training, a process that is well known in the art ("equalizer training sequence"). Upon detecting the first section 302, the demodulation logic 206 considers the rest of the preamble 300 as an equalizer training sequence.

Figure 4:
FIG. 4 is a block diagram depicting an exemplary embodiment of the structure of a preamble utilized by demodulation logic of another cable modem termination system (CMTS)

FIG. 4 is a block diagram depicting an exemplary embodiment of the structure of a preamble 400 for the demodulation logic 216 of the CMTS 118-2. The preamble 400 illustratively includes a first section 402 and a second section 404. The first section 402 includes data bits indicative of a pre-defined, unique pattern expected by the demodulation logic 214. For example, the first section 402 may include one or more unique data words or a pre-defined pilot sequence. The second section 404 includes an equalizer training sequence. Upon detecting the first section 402, the demodulation logic 214 considers the rest of the preamble 400 as an equalizer training sequence.

In accordance with one aspect of the invention, the CMTS 118-1 and the CMTS 118-2 are configured to instruct the CMs 112A and 112B to use a concatenated preamble. The preamble 300 required by the demodulation logic 206 is concatenated with the preamble 400 required by the demodulation logic 216. The concatenated preamble is then used in the burst profile of both the CMTS 118-1 and the CMTS 118-2. The concatenated preamble may be used during IM intervals or both IM and SM intervals. The preamble pattern to use (i.e., concatenated or native) is specified per usage interval in the UCD (e.g., the concatenated preamble is specified for use in the IM or IM and SM intervals).

Figure 5:
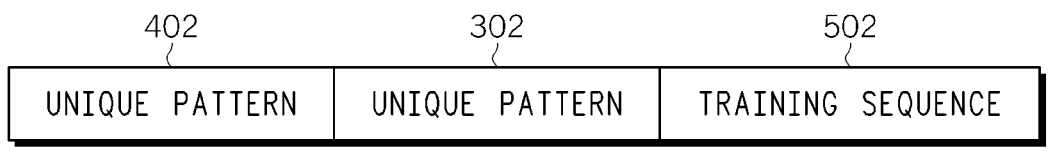
FIG. 5 is a block diagram depicting an exemplary embodiment of the structure of a concatenated preamble in accordance with one or more aspects of the invention.

FIG. 5 is a block diagram depicting an exemplary embodiment of the structure of a concatenated preamble 500 in accordance with one or more aspects of the invention. The concatenated preamble 500 is a concatenation of the preamble 300 and the preamble 400. The concatenated preamble 500 includes the section 402, the section 302, and an equalizer training sequence 502. The demodulation logic 206 will successfully recognize a burst by identifying the section 302 in the concatenated preamble 500. The remaining part of the concatenated preamble 500 is used as an equalizer training sequence, namely, the equalizer training sequence 502. The demodulation logic 216 will successfully detect the section 402 in the concatenated preamble 500. The remaining part of the concatenated preamble 500 is used as an equalizer training sequence, namely, the section 302 and the equalizer training sequence 502. Since sequence 502 is the common training sequence, section 302 does not affect the training operation. It is to be understood that the order of the sections 402 and 302 may be reversed.

For example, the demodulation logic 206 may include a BCM3137 burst receiver commercially available from Broadcom Corporation of Irvine, Calif. The demodulation logic 216 may include a BCM3138 or a BCM3140 burst receiver also commercially available from Broadcom Corporation. For the BCM3137, the preamble includes a pre-unique word, a unique word, and an equalizer training sequence. During a burst detection phase, the BCM3137 searches for the unique word during the incoming burst preamble. Once detecting the unique word, the BCM3137 considers the rest of the preamble as a training sequence. For the BCM3138/BCM3140 burst receiver, the preamble includes a pilot pattern followed by an equalizer training sequence. The BCM3138/BCM3140 requires the beginning of the incoming burst preamble to match the pre-defined pilot pattern and uses the rest of the preamble as a training sequence. Thus, in accordance with the invention, a CMTS using the BCM3137 and a CMTS using the BCM3138/BCM3140 can be adapted to instruct CMs to use a burst profile having a concatenated preamble. The concatenated preamble includes the pilot pattern expected by the BCM3138/BCM3140, followed by the pre-unique word, and then the unique word expected by the BCM3137, and then by an equalizer training sequence. The BCM3137 will search for and locate the unique word in the concatenated preamble and use the rest as an equalizer training sequence. The BCM3138/BCM3140 will locate the pilot pattern at the beginning of the concatenated preamble and use the rest of the concatenated preamble, including the pre-unique and unique words, as an equalizer training sequence.

The concatenated preamble of the invention allows the MDFO feature to operate seamlessly across CMTS platforms. The technique compensates for the fact that the demodulation logic of two CMTS platforms uses different preamble patterns to detect an upstream burst from cable modems. By concatenating both preamble patterns together, the demodulation logic of each CMTS is able to share the same preamble pattern. This allows two CMTS platforms to detect IM bursts regardless of which downstream frequency a cable modem is using. As a result, each CMTS is able to successfully employ MDFO operations.

Because the size of the preamble affects both the size of the UCD and the size of upstream bursts, the increased size of the concatenated preamble increases both the downstream and upstream overheads. However, since the preambles comprising the concatenated preamble depend on implementation, the performance impact in terms of the increased overhead can be different based on the different implementations.

Although FIG. 2 shows two CMTS platforms, the concatenated preamble may be used with more than two CMTS platforms as shown in FIG. 1. Each of the CMTS platforms 118 includes demodulation logic that expects one preamble or another. A concatenated preamble is formed from both preambles and included in the burst profile of each CMTS platform 118. Those skilled in the art will appreciate that the concatenated preamble of the invention may be used with more than two different native preambles (e.g., a concatenation of three or more preambles). However, the number of preambles that can be concatenated is limited by the amount of increased downstream and/or upstream overheads, as well as the particular requirements of the different demodulation logics. For instance, no more than one demodulation logic can expect its particular pilot or unique word pattern to appear first in the concatenated preamble.

Although the CMTSs 118-1 and 118-2 are shown as having RF interfaces 208 and 216, those skilled in the art will appreciate that the CMTSs 118-1 and 118-2 may be configured with optical interfaces. In such an embodiment, the combiner 218 and splitter 220 are configured to operate on the optical signals. Conversion of optical signals to RF signals at the RX and TX modules is not required.

Figure 6:
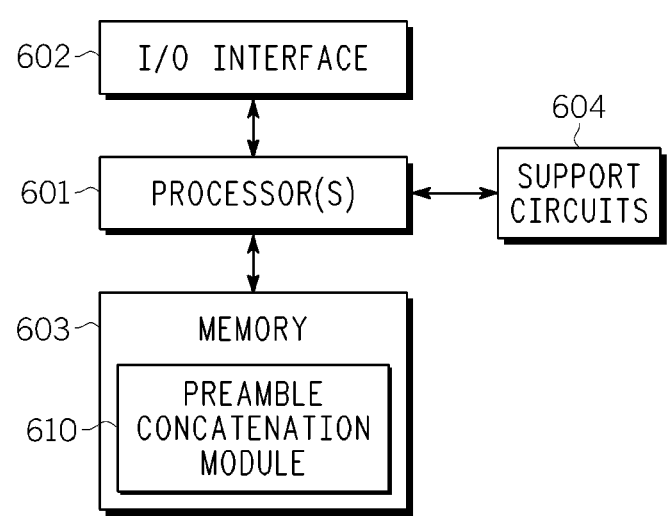
FIG. 6 is a block diagram depicting an exemplary embodiment of the control logic of a CMTS in accordance with one or more aspects of the invention.

FIG. 6 is a block diagram depicting an exemplary embodiment of control logic 600 in accordance with one or more aspects of the invention. The control logic 600 may be used as the control logic 202 and 210 of FIG. 2. The control logic 600 includes one or more processors 601, a memory 603, various support circuits 604, and an I/O interface 602. The processor(s) 601 may be any type of microprocessor known in the art. The support circuits 604 for the processor(s) 601 include conventional cache, power supplies, clock circuits, data registers, I/O interfaces, and the like. The I/O interface 602 may be directly coupled to the memory 603 or coupled through the processor(s) 601. The I/O interface 602 may be coupled to control interfaces of various circuits in the CMTS, such as the modulation and demodulation logic.

The memory 603 stores processor-executable instructions and/or data that may be executed by and/or used by the processor(s) 601 as described further below. These processor-executable instructions may comprise hardware, firmware, software, and the like, or some combination thereof. Modules having processor-executable instructions that are stored in the memory 603 include preamble concatenation module 610. The preamble concatenation module 610 is configured to form a concatenated preamble from a plurality of native preambles. The plurality of native preambles includes the native preamble of demodulation logic in the CMTS having the control logic 600, as well as at least one additional native preamble for demodulation logic of at least one additional CMTS. The preamble concatenation module 610 is further configured to form a burst profile having the concatenated preamble and transmit the burst profile towards cable modems as part of downstream transmissions.

The memory 603 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for use with a computer system. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Figure 7:
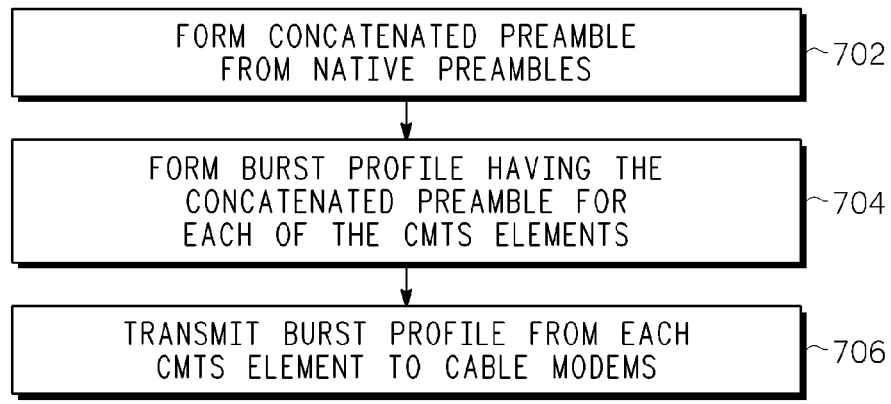
FIG. 7 is a flow diagram depicting an exemplary embodiment of a method performed in the data-over-cable system of FIG. 1 in accordance with one or more aspects of the invention.

FIG. 7 is a flow diagram depicting an exemplary embodiment of a method 700 performed in the data-over-cable system 100 in accordance with one or more aspects of the invention. Each of the CMTS elements 118 includes demodulation logic configured to detect one of a plurality of native preambles. The method 700 begins at step 702, where a concatenated preamble is formed from each of the plurality of native preambles. Each of the native preambles includes a first section having a unique pattern and a second section having an equalizer training sequence. The concatenated preamble includes a first section having the unique pattern of each of the plurality of native preambles in a sequence and a second section having an equalizer training sequence. At step 704, a burst profile having the concatenated preamble is formed for each of the CMTS elements 118. At step 706, the burst profile is transmitted from each of the CMTS elements 118 to the cable modems 112. The burst profile may be transmitted from each of the CMTS elements in UCD messages.

Figure 8:
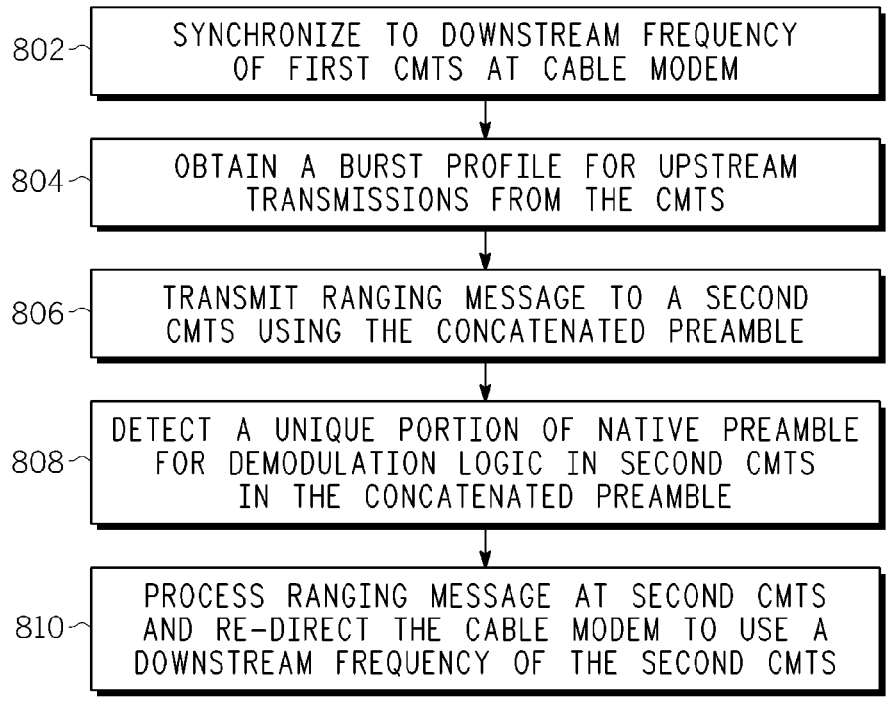
FIG. 8 is a flow diagram depicting an exemplary embodiment of a method for downstream frequency override in accordance with one or more aspects of the invention.

FIG. 8 is a flow diagram depicting an exemplary embodiment of a method 800 for downstream frequency override in accordance with one or more aspects of the invention. It is assumed the method 700 is being performed by the data-over-cable system 100. The method 800 begins at step 802, a cable modem synchronizes to a downstream frequency of a first CMTS. At step 804, the cable modem obtains a burst profile for upstream transmissions from the first CMTS. The burst profile includes the concatenated preamble. At step 806, the cable modem transmits a RNG-REQ message to a second CMTS using the concatenated preamble. The cable modem may transmit the RNG-REQ message to the second CMTS during an IM interval of the first CMTS. At step 808, the demodulation logic in the second CMTS detects a unique portion of its native preamble in the concatenated preamble. The remaining portion of the concatenated preamble is used as an equalizer training sequence. At step 810, the second CMTS processes the RNG-REQ message and re-redirects the cable modem to use one of its downstream frequencies.

The processes in FIGS. 7 and B may be implemented in hard wired devices, firmware or software running in a processor. A processing unit for a software or firmware implementation is preferably contained in the CMTS. Any of the processes illustrated in FIGS. 7 and 8 may be contained on a computer readable medium which may be read by processor 601. A computer readable medium may be any medium capable of carrying instructions to be performed by a microprocessor, including a CD disc, DVD disc, magnetic or optical disc, tape, or silicon based removable or non-removable memory.

Those skilled in the art will appreciate that the preamble concatenation technique of the invention allows a multiple downstream frequency override feature to operate seamlessly across CMTS platforms. The technique compensates for the fact that the demodulation logic of two or more CMTS platforms may use different preamble patterns to detect an upstream burst from cable modems. By concatenating both preamble patterns together, the demodulation logic of each CMTS is able to share the same preamble pattern. The invention allows multiple CMTS platforms to detect IM bursts regardless of which downstream frequency a cable modem is using. As a result, each CMTS is able to successfully employ multiple downstream frequency override operations.

While the foregoing is directed to illustrative embodiments of the present invention, other and further embodiments of the invention may be devised without departing from the basic scope thereof, and the scope thereof is determined by the claims that follow.

What is claimed is:

1. A method for communicating in a data-over-cable system having a plurality of cable modem termination system elements each having demodulation logic configured to detect one of a plurality of native preambles in upstream transmissions, comprising:
   forming a concatenated preamble from each of the plurality of native preambles;
   forming a burst profile having the concatenated preamble for each of the cable modem termination system elements; and
   transmitting the burst profile from each of the cable modem termination system elements to a plurality of cable modems,
   wherein each of the plurality of native preambles comprises a first section having a unique pattern and a second section having an equalizer training sequence, and wherein the concatenated preamble includes a first section having the unique pattern of each of the plurality of native preambles in a sequence and a second section having an equalizer training sequence.

2. The method of claim 1, wherein the unique pattern in the first section of each of the plurality of native preambles comprises one of: (a) one or more unique words; or (b) a pilot pattern.

3. The method of claim 1, wherein the burst profile is transmitted from each of the cable modem termination system elements in upstream channel descriptor messages.

4. The method of claim 1, further comprising:
   sending a message to a first cable modem termination system of the plurality of cable modem termination system elements from a first cable modem of the plurality of cable modems using the concatenated preamble.

5. The method of claim 4, wherein the message comprises a range request message, and wherein the message is sent by the first cable modem during an initial maintenance of a second cable modem termination system of the plurality of cable modem termination system elements.

6. The method of claim 5, wherein the first cable modem is initially synchronized to a downstream frequency of the second cable modem termination system, and wherein the method further comprises:
   re-directing the first cable modem to use a downstream frequency of the first cable modem termination system in response to the range request message.

7. A cable modem termination system apparatus, comprising:
   modulation logic configured to provide downstream transmissions via at least one downstream frequency;
   demodulation logic configured to detect a native preamble in upstream transmissions from at least a portion of a plurality of cable modems; and
   control logic configured to form a concatenated preamble from a plurality of native preambles, form a burst profile having the concatenated preamble, and transmit the burst profile towards the plurality of cable modems as part of the downstream transmissions, the plurality of native preambles including the native preamble and at least one other native preamble for demodulation logic of a respective at least one other cable modem termination system,
   wherein each of the plurality of native preambles comprises a first section having a unique pattern and a second section having an equalizer training sequence, and wherein the concatenated preamble includes a first section having the unique pattern of each of the plurality of native preambles in a sequence and a second section having an equalizer training sequence.

8. The apparatus of claim 7, wherein the unique pattern in the first section of each of the plurality of native preambles comprises one of: (a) one or more unique words; or (b) a pilot pattern.

9. The apparatus of claim 7, wherein the control logic is configured to transmit the burst profile in upstream channel descriptor messages.

10. A data-over-cable apparatus, comprising:
    a plurality of cable modems;
    a transport network; and
    a plurality of cable modem termination system elements in communication with the plurality of cable modems through the transport network, each of the plurality of cable modem termination system elements including:
       demodulation logic configured to detect one of a plurality of native preambles in upstream transmissions;
       modulation logic configured to provide downstream transmissions via at least one downstream frequency; and
       control logic coupled to the demodulation logic and the modulation logic;
    wherein the control logic in each of the plurality of cable modem termination system elements is configured to form a concatenated preamble from each of the plurality of native preambles, form a burst profile having the concatenated preamble, and transmit the burst profile towards the plurality of cable modems as part of the downstream transmissions thereof, and
    wherein each of the plurality of native preambles comprises a first section having a unique pattern and a second section having an equalizer training sequence, and wherein the concatenated preamble includes a first section having the unique pattern of each of the native preambles in a sequence and a second section having an equalizer training sequence.

11. The apparatus of claim 10, wherein the unique pattern in the first section of each of the plurality of native preambles comprises one of: (a) one or more unique words; or (b) a pilot pattern.

12. The apparatus of claim 10, wherein the control logic is configured to transmit the burst profile in upstream channel descriptor messages.

13. The apparatus of claim 10, wherein each of the plurality of cable modems is coupled to the transport network for receiving the at least one downstream frequency from each of the plurality of cable modem termination system elements and for transmitting on at least one upstream frequency to one of the plurality of cable modem termination system elements.

14. The apparatus of claim 13, wherein each of the plurality of cable modems is configured to send range-request messages using the concatenated preamble to the corresponding one of the cable modem termination system elements.

15. The apparatus of claim 14, wherein the control logic of each of the plurality of cable modem termination system elements is further configured to instruct any of the plurality of cable modems to switch from one downstream frequency to another downstream frequency in response to a range-request message.

16. A computer readable medium having stored thereon instructions that when executed by a processor cause the processor to perform a method in a data-over-cable system having a plurality of cable modem termination system elements each having demodulation logic configured to detect one of a plurality of native preambles in upstream transmissions, the method comprising:
- forming a concatenated preamble from each of the plurality of native preambles;
- forming a burst profile having the concatenated preamble for each of the cable modem termination system elements; and
- providing the burst profile for transmission from each of the cable modem termination system elements to a plurality of cable modems,
- wherein each of the plurality of native preambles comprises a first section having a unique pattern and a second section having an equalizer training sequence, and wherein the concatenated preamble includes a first section having the unique pattern of each of the plurality of native preambles in a sequence and a second section having an equalizer training sequence.

* * * * *